United States Patent [19]

Ishiharada et al.

[11] Patent Number: 5,692,088

[45] Date of Patent: Nov. 25, 1997

[54] OPTICAL WAVEGUIDE TUBE

[75] Inventors: Minoru Ishiharada, Urawa; Hideo Sugiyama, Higashimurayama; Itsuo Tanuma, Sayama, all of Japan

[73] Assignee: Bridgestone Corporation, Tokyo, Japan

[21] Appl. No.: 508,684

[22] Filed: Jul. 28, 1995

[30] Foreign Application Priority Data

| Jul. 29, 1994 | [JP] | Japan | 6-197468 |
| Jul. 29, 1994 | [JP] | Japan | 6-197469 |
| Jul. 29, 1994 | [JP] | Japan | 6-197470 |
| Jul. 29, 1994 | [JP] | Japan | 6-197476 |
| Jul. 29, 1994 | [JP] | Japan | 6-197477 |

[51] Int. Cl.[6] .................................................. G02B 6/02
[52] U.S. Cl. ........................ 385/125; 385/141; 385/123; 427/454
[58] Field of Search ........................ 385/125, 123, 385/124, 126, 31, 117, 141; 427/459; 362/32

[56] References Cited

U.S. PATENT DOCUMENTS

| 4,009,382 | 2/1977 | Nath | 385/125 X |
| 4,927,231 | 5/1990 | Levatter | 385/125 X |
| 5,340,864 | 8/1994 | Tomihashi et al. | 524/297 |

*Primary Examiner*—Phan T. H. Palmer
*Attorney, Agent, or Firm*—Sughrue, Mion, Zinn, Macpeak & Seas, PLLC

[57] ABSTRACT

An optical waveguide tube has a transparent core received in a cladding having a lower refractive index than the core. The entire cladding or an inner layer of the cladding fitting on the core is formed of a fluororubber which has been vulcanized by radical crosslinking. The vulcanized fluororubber has a residual halogen atom content of up to 80 ppm. A trapping agent surrounds the cladding for trapping coloring substances. The optical tube maintains satisfactory optical transmission capability over a long time while the core is not colored.

32 Claims, 3 Drawing Sheets

OPTICAL WAVEGUIDE TUBE

TECHNICAL FIELD

This invention relates to an optical waveguide tube capable of maintaining satisfactory light transmission performance over a long period of time.

BACKGROUND OF THE INVENTION

Optical waveguide tubes including a transparent core and a lower refractive index cladding have been used in a variety of light transmission applications. Both solid and liquid cores are known. Since solid cores are rigid or inflexible, liquid cores are often used especially when it is desired to effectively transmit a large quantity of light through cores having a large diameter.

Various liquid cores are known. For example, Japanese Patent Application Kokai (JP-A) Nos. 253303/1988 and 273804/1988 propose the use of siloxane polymers. Cores of silicone oil, however, give rise to a swelling problem when combined with a certain type of cladding. More particularly, although silicone rubber performs well as the cladding with respect to heat resistance, low-temperature resistance, and flexibility, the silicone rubber cladding can be swollen with the silicone oil core so that the cladding becomes brittle or increases its internal volume with the risk of air entry. The silicone rubber cladding also suffers from the problem of increased light scattering due to the irregularity of its inner surface.

We found that for liquid cores, especially cores of silicone oil, fluororubber claddings are effective with respect to swelling. However, it was found that during long-term service, optical fibers with fluororubber claddings experience a gradual loss of optical transmission capability. There is a demand to minimize such a loss of optical transmission capability of fluororubber-clad optical fibers during long-term service.

SUMMARY OF THE INVENTION

Therefore, an object of the present invention is to provide an optical waveguide tube which experiences a minimal loss of optical transmission capability during long-term service.

We found that when an optical transmission tube is constructed by enclosing a core of silicone oil with a cladding which is formed of a fluororubber on at least the inner surface thereof in contact with the core, the cladding is free of swelling and satisfactory optical transmission capability is maintained over a long period of time. Since the cladding inner surface is formed of fluororubber, the tube has a large angular aperture so that it can taken in a large quantity of light. Even when a rubber elastomer having poor inner surface smoothness, typically silicone rubber is used as the base of the cladding, formation of a fluororubber layer inside the base contributes to an improvement in inner surface smoothness, minimizing optical scattering at the core-cladding interface.

We also found that an optical waveguide tube having a fluororubber cladding loses its optical transmission capability with the lapse of time because a coloring or yellowing component in the cladding is leached into the core. Less colored fluororubber is then desirable as the cladding. We have found that fluororubber vulcanized by crosslinking through radical reaction is best suited for this purpose. Coloring of fluororubber is largely affected by residual or free halides therein. We have found that such adverse effect is minimized by limiting the content of residual halides in vulcanized fluororubber to 80 ppm or less calculated as halogen atom.

More particularly, methods for vulcanizing fluororubber generally include polyamine vulcanization, polyol vulcanization, and radical reaction vulcanization such as peroxide vulcanization and electron ray vulcanization. The polyamine and polyol vulcanization, especially polyamine vulcanization has the problem that by-products created during vulcanization and vulcanizing agents themselves have substantial coloring power and these coloring components are leached into the core so that the transmitted light is colored. The peroxide vulcanization causes less coloring and thus suitable for the cladding of optical transmission tubes. The electron ray vulcanization involves creating radicals with the aid of electron rays and crosslinking with triallyl isocyanurate (TAIC) or the like, leaving lesser reaction by-products. When fluororubber crosslinked through such radical reaction is used as a cladding, there is obtained an optical transmission tube which can maintain optical transmission capability over a long term and is less colored. As the unvalcanized fluororubber to be subject to radical crosslinking, a fluororubber having iodine atoms in its molecule is advantageous because it is least colored upon crosslinking.

When green fluororubber is vulcanized, peroxide vulcanization is preferred because of less coloring. The peroxide vulcanization is performed as follows. A fluororubber having halogen atoms in a molecule is used whereupon halogen atoms are removed from within the molecule by radicals resulting from the peroxide, to thereby form high activity radicals with which vulcanization proceeds. As the intramolecular halogen atoms, iodine atoms are preferred to bromine atoms. In either case, residual halides can be left in the fluororubber. For preventing coloring, it is effective to remove the residual halide. As to the intramolecular halogen atoms, iodine atoms are preferred to bromine atoms from the coloring aspect, but bromine atoms are advantageous from the reactivity aspect. By vulcanizing a green fluororubber having bromine atoms in a molecule and removing residual bromide from the vulcanized fluororubber, there is obtained a rubber which is suitable for use as the cladding. That is, a green fluororubber having bromine atoms in a molecule and hence less favorable from the coloring aspect is vulcanized into a vulcanized fluororubber which is useful as a cladding of an optical waveguide tube after removal of residual bromide. More particularly, a vulcanized fluororubber having a residual halogen atom content of 80 ppm or less is useful as a cladding to form an optical waveguide tube which maintains optical transmission capability over a long time and is prevented from coloring.

While coloring of fluororubber is largely affected by a residual or halide therein as mentioned above, other components in the fluororubber or silicone rubber cladding and other components of the optical waveguide tube, for example, crosslinking agents (vulcanizing agents), co-crosslinking agents, various additives in dispersed state, unreacted chemicals, and thermally degraded products also have influence as coloring or yellowing substances. It is then effective to use an agent for trapping coloring substances by introducing the trapping agent into the cladding comprising fluororubber or into a cover around the cladding, or by interposing the trapping agent between the cladding and a protective sheath around the cladding, or by applying a coating of the trapping agent to the cladding. Use of a coloring substance trapping agent ensures that an optical waveguide tube maintains optical transmission capability over a long time and prevents the tube from being colored.

Briefly stated, the present invention is directed to an optical waveguide tube comprising a transparent core and a cladding having a lower refractive index than the core. At least the inner surface of the cladding in contact with said core is formed of a fluororubber which has been vulcanized by radical reaction crosslinking. The vulcanized fluororubber has a residual halide content of up to 80 ppm calculated as halogen atom.

BRIEF DESCRIPTION OF THE DRAWINGS

FIGS. 1 to 5 corresponds to first to fifth embodiments.

FIGS. 6 to 9 are modifications of the end portion of the fifth embodiment.

BEST MODE FOR CARRYING OUT THE INVENTION

Figure 1:
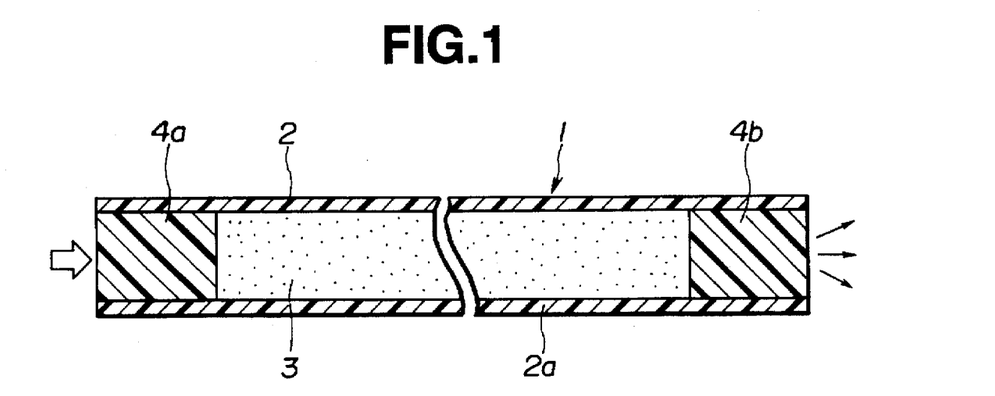
FIGS. 1 to 9 are schematic, partially omitted, cross-sectional views of optical waveguide tubes according to different embodiments of the invention.

Referring to FIG. 1, there is illustrated an optical waveguide tube according to a first embodiment of the invention. The optical waveguide tube 1 includes a hollow tubular cladding 2 and a core 3 received therein having a higher refractive index than the cladding. The cladding 2 has opposite open ends blocked with sealing plugs 4a and 4b. It is understood that the plugs are essential where the core 3 is liquid or fluid, but may be omitted when the core 3 is solid.

Figure 2:
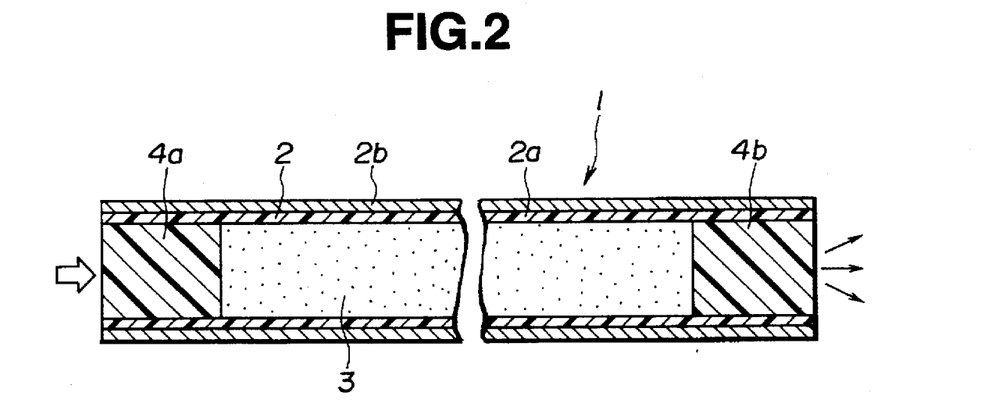

According to the present invention, at least the inner surface of the cladding 2 in contact with the core 3 is formed of a vulcanized fluororubber. In one embodiment, the entire cladding 2 consists of a vulcanized fluororubber 2a as shown in FIG. 1. In another embodiment, the cladding 2 includes a main body of another rubber elastomer 2b and a layer of vulcanized fluororubber 2a on the inner surface of the body as shown in FIG. 2.

In the optical waveguide tube of the invention, the core material is not critical. Any solid, liquid or fluid transparent material may be used as long as it has a higher refractive index than the cladding material.

The solid transparent materials are preferably acrylic resins and methacrylic resins, for example, homopolymers and copolymers of alkyl acrylates and alkyl methacrylates such as methyl acrylate and methyl methacrylate, and copolymers of these monomers with other monomers which are copolymerizable therewith to form transparent polymers. Examples of the liquid or fluid transparent material include aqueous solutions of inorganic salts, polyhydric alcohols such as ethylene glycol and glycerin, silicone oils such as polydimethylsiloxane and polyphenylmethylsiloxane, polyethers, polyesters, hydrocarbons such as liquid paraffin, halogenated hydrocarbons such as trifluoroethylene chloride oil, phosphates such as tris(chloroethyl) phosphate and trioctyl phosphate, and solutions of polymers (e.g., polyisobutylene) diluted with suitable solvents. Among these, liquid or fluid core materials, especially silicone oil are advantageous for the purpose of the invention.

The silicone oil used herein is not critical. For example, dimethylsilicone oil, methylphenylsilicone oil, alkyl-modified silicone oil, and fluorosilicone oil are useful. Preferred from the aspects of heat resistance and high refractive index are those silicone oils which contain phenyl groups in an amount of at least 5 mol %, especially 10 to 60 mol % of the entire organic groups attached to silicon atoms.

The optical transmission tube of the invention has the cladding 2 which is entirely formed of the vulcanized fluororubber 2a as shown in FIG. 1 or which includes a layer of vulcanized fluororubber 2a lined to the inner surface of a tubular layer of rubber elastomer 2b as shown in FIG. 2.

The rubber elastomer layer 2b may be formed of a fluororubber or another rubber material. Examples of the other rubber material include silicone rubbers such as dimethylsilicone rubber, methylphenylsilicone rubber, and fluorosilicone rubber; butyl rubbers such as butyl rubber, halogenated butyl rubber, and saturated butyl rubber; ethylene-propylene-diene terpolymer (EPDM); acrylic rubber; nitrile rubber; and thermoplastic elastomers such as SBS, SEBS, and SIS. The rubber elastomer layer may have a single layer structure or two or multi-layer structure of such elastic material. Among these, silicone rubbers, butyl rubbers, and EPDM rubbers as vulcanized are preferred as well as thermoplastic elastomers. The silicone rubbers are preferred from the aspect of heat resistance while the butyl rubbers and EPDM rubbers are preferred from the aspect of gas or moisture barrier.

The fluororubbers or fluorinated rubbers used herein include VD fluororubbers such as vinylidene fluoride (VDF)-hexafluoropropylene (HFP) bipolymers and VDF-HFP-tetrafluoroethylene (TFE) terpolymers, propylene-tetrafluoroethylene fluororubbers, tetrafluoroethyleneperfluoroalkyl vinyl ether fluororubbers, and thermoplastic fluororubbers, with the VD fluororubbers being preferred.

The tubular rubber elastomer is lined with the fluororubber to form a fluororubber layer by various techniques, for example, by co-extruding the fluororubber and the rubber elastomer (optionally on a mandrel) or by extruding the fluororubber into a tube and coating the rubber elastomer thereon. Preferably a tubular preform of rubber elastomer is coated on the inner surface with a solution of the fluororubber in an organic solvent. This inner surface coating technique can form a fluororubber layer having superior smoothness.

In the practice of the invention, the fluororubber is vulcanized for the purposes of imparting shape retention (especially at elevated temperature), preventing the fluororubber layer from wrinkling or separating from the body as a result of volume expansion or contraction, and preventing the fluororubber from being dissolved in the core fluid. As the vulcanizing method, polyamine vulcanization and polyol vulcanization are possible, but radical vulcanization techniques including peroxide vulcanization, electron ray vulcanization and photo-crosslinking are preferred because the vulcanized fluororubber layer is less colored.

For the peroxide vulcanization, the peroxides used include ketone peroxides, hydroperoxides, dialkylperoxides, diacylperoxides and peroxyesters. Exemplary are 2,5-dimethylhexane-2,5-dihydroperoxide, 2,5-dimethyl-2,5-di(t-butylperoxy)hexyne-3, di-t-butyl peroxide, t-butylcumyl peroxide, 2,2-bis(t-butylperoxy)butane, 2,2-bis(t-butylperoxy)octane, 1,1-bis(t-butylperoxy)cyclohexane, t-butylperoxybenzoate, benzoyl peroxide, lauroyl peroxide, 2,4-dichlorobenzoyl peroxide, 1,1-bis(t-butylperoxy)-3,3,5-trimethylcyclohexane, n-butyl-4,4-bis(t-butylperoxy)valerate, dicumyl peroxide, α,α'-bis(t-butylperoxyisopropyl)benzene, and 2,5-dimethyl-2,5-di(t-butylperoxy)hexane. Among these, peroxides having an aromatic ring-free aliphatic or alicyclic structure are preferred because of less coloring of decomposition products, for example, 2,5-dimethylhexane-2,5-dihydroperoxide, 2,5-dimethyl-2,5-di(t-butylperoxy)hexyne-3, di-t-butyl peroxide, 2,2-bis(t-butylperoxy)butane, 2,2-bis(t- butylperoxy)octane, 1,1-bis(t-butylperoxy)cyclohexane, lauroyl peroxide, 1,1-bis(t-butylperoxy)-3,3,5-trimethylcyclohexane, and 2,5-dimethyl-2,5-di(t-butylperoxy)hexane.

The amount of the peroxide used may be appropriately determined although it is preferably about 0.1 to 10 parts, more preferably about 0.5 to 5 parts, most preferably 2 to 4 parts by weight per 100 parts by weight of the fluororubber. Less amounts of the peroxide would result in short vulcanization so that no sufficient rubber properties are developed and unvalcanized fluororubber is leached into the core to cause optical scattering in the core and at the core-cladding interface, deteriorating optical transmission capability. Additionally residual halogen in the fluororubber is released at elevated temperature to deteriorate optical transmission capability. Inversely, if the peroxide is used in excess, the peroxide, which is generally less miscible with the fluororubber, would agglomerate to cause bubbling during vulcanization. This would increase optical scattering at the core-cladding interface. In the case of a liquid core, silicone oil can penetrate into the rubber elastomer through pinholes in the cladding fluororubber to cause swelling. There are left more decomposition products and unreacted peroxide, also adversely affecting optical characteristics.

For peroxide vulcanization, a co-crosslinking agent is preferably blended to enhance the crosslinking degree of fluororubber. Useful co-crosslinking agents include acryloxy group-containing compounds, methacryloxy group-containing compounds, and aryl group-containing compounds. Often, derivatives of acrylic acid and methacrylic acid, typically esters thereof are used.

For the esters of acrylic acid and methacrylic acid, exemplary alcohol residues are alkyl groups having 1 to 20 carbon atoms such as methyl, ethyl, dodecyl, stearyl, and lauryl as well as cyclohexyl, tetrahydrofurfuryl, aminoethyl, 2-hydroxyethyl, 3-hydroxypropyl, and 3-chloro-2-hydroxypropyl groups. Esters with polyhydric alcohols such as ethylene glycol, triethylene glycol and polyethylene glycol are also useful.

The aryl group-containing compounds include diallyl phthalate, diallyl fumarate, diallyl maleate, triallyl isocyanurate, and triallyl cyanurate.

The co-crosslinking agent is preferably used in an amount of about 0.1 to 20 parts, especially about 0.5 to 5 parts by weight per 100 parts by weight of the fluororubber.

In the embodiment wherein a rubber elastomer is lined with a fluororubber, an adhesive agent is preferably blended in the fluororubber to improve bond to the rubber elastomer layer. The adhesive agent may be selected in accordance with a particular type of rubber elastomer. Where the rubber elastomer layer is of silicone rubber, for example, silane coupling agents are desirably blended. Useful silane coupling agents are known ones, for example, γ-chloropropylmethoxysilane, vinyltrichlorosilane, vinyltriethoxysilane, vinyl-tris(β-methoxyethoxy)silane, γ-methacryloxypropyltrimethoxysilane, β-(3,4-ethoxycyclohexyl)ethyl-trimethoxysilane, γ-glycidoxypropyltrimethoxysilane, vinyltriacetoxysilane, γ-mercaptopropyltrimethoxysilane, γ-aminopropyltriethoxysilane, and N-β-(aminoethyl)-γ-aminopropyltrimethoxysilane. Those silane coupling agents terminated with a methacryl or vinyl group are preferred because of less coloring.

Satisfactory results are obtained by blending the adhesive agent in an amount of less than about 5 parts by weight per 100 parts by weight of the fluororubber.

If desired, coloring agents, UV absorbers, antioxidants and anti-discoloring agents may be added to the fluororubber.

For peroxide vulcanization, a fluororubber containing halogen atoms as radical activating points in a molecule is used. The peroxide supplies radicals which couple off halogen atoms in the molecule to create highly active radicals whereby vulcanization proceeds as shown below. The position of halogen atoms is intermediate or at the end of the backbone or on a side chain, with halogen atoms attached to the end of the backbone being preferred.

(X is a halogen atom such as I, Br or Cl.)

As to the intramolecular halogen atom, bromine is often used because of high reactivity. According to our finding, a fluororubber having bromine atoms in its molecule is more colored whereas a fluororubber having iodine or chlorine atoms in its molecule is less colored and hence, more preferable as the cladding despite somewhat low reactivity. In this regard, as the fluororubber cladding of the invention cured by radical crosslinking, a radical crosslinked one of a fluororubber having iodine or chlorine atoms in its molecule is preferred. However, when the content of residual halide is reduced as will be described later, a fluororubber having bromine atoms in its molecule is also advantageously used in the practice of the invention.

Peroxide vulcanizing conditions vary with a particular type of peroxide. For Perhexa 25B (2,5-dimethyl-2,5-di(t-butylperoxy)hexane), for example, primary vulcanization at 140° to 160° C. for 10 minutes to 1 hour is followed by secondary vulcanization at 160° to 200° C. for 1 to 20 hours. A press, oven or autoclave may be used for vulcanization. In the case of an oven and autoclave, purging with an inert gas such as nitrogen or steam or vacuuming is sometimes necessary in order to avoid crosslinking retardation by oxygen. The vulcanization temperature and time may be properly determined. With lower temperatures or shorter times, vulcanization of rubber proceeds to an insufficient extent and adhesion is sometimes poor. With higher temperatures or longer times, the tube or rubber would undergo decomposition and a loss of adhesive force (particularly when silane coupling agents are used).

In the case of electron ray vulcanization, radicals are created by irradiation of electron rays and triallyl isocyanurate (TAIC), α-TMPT and TMPT are used to induce crosslinking. Electron rays are preferably irradiated in a dose of about 0.5 to 20 Mrad, more preferably about 2 to 10 Mrad and in an inert gas atmosphere such as nitrogen gas. The amount of a co-crosslinking agent is the same as above.

Also for electron ray vulcanization, a green fluororubber containing bromine, iodine or chlorine atoms in a molecule, especially at the end thereof is preferred because of less coloring.

After fluororubber is vulcanized, it is further subject to solvent washing, heat treatment, or vacuum treatment to thereby reduce the content of a residual halide in the vulcanized fluororubber to 80 ppm or less, preferably 30 ppm or less, especially 5 ppm or less. Use of vulcanized fluororubber having such a reduced residual halide content is recommended. The term "residual halide" used herein includes halogen atoms, molecules and ions and compounds of halogen with other atoms or molecules, often in molecular or hydride form. Thus typical residual halides are halogen molecules and halogen compounds such as HI and HBr.

Solvent washing of vulcanized fluororubber is carried out, for example, by washing the fluororubber with a solvent in which halogen molecules and halogen compounds such as those of iodine and bromine are soluble and which does not attack the fluororubber. Exemplary solvents are lower alcohols, ketones, aromatic hydrocarbons, water, fluorinated solvents, silicones, petroleum solvents, phosphate solvents and mixtures thereof, with ethanol and water being preferred. Washing may be performed by immersion, steam stripping or the like.

In order to promote sublimation and evaporation of halogen molecules, it is effective that the vulcanized fluororubber is heat treated at elevated temperatures, preferably above the melting point of halogen molecule. Alternatively, a vacuum oven or the like is used to place the vulcanized fluororubber in vacuum or reduced pressure to remove halogen molecules.

The solvent washing, heat treatment, or vacuum treatment may be done singly or in combination. For example, heat treatment and vacuum treatment can be done concurrently.

As mentioned above, a vulcanized fluororubber having a residual halide content of up to 80 ppm calculated as halogen atom is used in the practice of the invention. The residual halide content is measured as follows.

In a vessel equipped with a trap of $AgNO_3$ solution, a crosslinked sample of a fluororubber composition containing a peroxide and an optional co-crosslinking agent as mentioned above or an electron crosslinked fluororubber sample is dissolved in an alcohol (typically methanol) and refluxed to extract residual halogen. A $AgNO_3$ solution is added to the alcohol to cause the residual halogen to precipitate as silver halide (AgX), which is filtered, heat dried and weighed. The precipitate is purified by washing with water, then with methanol and methyl ethyl ketone to remove impurities such as unreacted $AgNO_3$ and dissolved fluororubber. In this way, the amount of AgX is determined. The halogen species (X) of the silver halide (AgX) is determined by X-ray microanalysis (XMA). Then the amount of AgX is converted into an amount of halogen. The content of halogen in the sample is calculated according to the following formula.

Halogen content=(X amount/sample amount)×$10^6$ ppm

The halogen X is mainly bromine, iodine and chlorine although the analysis is also applicable to fluorine.

For reducing the amount of residual halides and other coloring substances in the vulcanized fluororubber layer, it is effective to incorporate an agent for trapping residual halides and other coloring substances, often referred to as a trapping agent, in the vulcanized fluororubber layer and/or rubber elastomer layer.

Any of trapping agents that capture residual halogen compounds and other coloring substances may be used. Useful examples include adsorbents such as activated carbon, silica, silica gel, alumina, molecular sieves and other zeolite adsorbents, compounds which are highly reactive with halogen, such as magnesium oxide, magnesium carbonate and silver nitrate, and ion exchange resins. They may be used alone or in admixture.

The trapping agents can capture residual halides and other coloring (typically yellowing) substances, for example, ingredients in the cladding and other optical waveguide tube components, such as crosslinking agents (e.g., peroxides), co-crosslinking agents, and additives, in decomposed, unreacted and thermally degraded forms. Zeolite adsorbents such as molecular sieves are preferred since they can effectively trap such coloring substances.

To promote trapping, UV or electron beams may be irradiated to convert halides into an active state such as ionized or radical state for enhancing interaction with the trapping agent.

The trapping agent, especially zeolite adsorbents, can capture not only the coloring substances but also moisture. Therefore, the trapping agent, especially zeolite adsorbents, can be used for reduction of water content in the tube.

The amount of the trapping agent added to the fluororubber or rubber elastomer is preferably 0.01 to about 20% by weight. Too low contents of the trapping agent are less effective for the purpose of reducing residual halides and other coloring substances whereas excessive contents would lower the adhesive force and smoothness of fluororubber and increase the refractive index.

The trapping agent is generally in particulate form having a particle size of up to 10 μm, especially up to 1 μm.

The construction of vulcanized fluororubber has been described. In the embodiment of FIG. 2 wherein a rubber elastic body is lined with a fluororubber layer, the fluororubber layer preferably has a radial thickness of 5 to 0.001 mm, especially 1 to 0.01 mm.

In one exemplary embodiment wherein the plugs 4 serve as an inlet window through which incident light enters the light waveguide tube and an outlet window through which the transmitted light emerges outside as shown in FIGS. 1 and 2, both the plugs must be transparent.

The material of the plugs which must be transparent include inorganic glasses such as quartz glass, Pyrex® glass, multi-component glass, sapphire, and quartz; and organic glasses and transparent plastic materials such as polyethylene, polypropylene, ABS resins, acrylonitrile-styrene copolymer resins, styrene-butadiene copolymers, acrylonitrile-EPDM-styrene terpolymers, styrene-methyl methacrylate copolymers, methacrylic resins, epoxy resins, polymethyl pentene, allyl diglycol carbonate resins, spiran resins, amorphous polyolefins, polycarbonates, polyamides, polyarylates, polysulfones, polyallyl sulfones, polyether sulfones, polyether imides, polyimides, polyethylene terephthalate, diallyl phthalate, fluororesins, polyester carbonates, and silicone resins. Preferred among these are inorganic glasses such as quartz glass, Pyrex® glass and multi-component glass because they are transparent, heat resistant and chemically stable so that they are chemically inert to reaction with the core fluid in contact therewith at the plug inner end or with gases or moisture in contact therewith at the plug outer end and thus maintain good performance over a long period of time. Where transparency is not necessary, use may be made of metals and ceramic materials.

For the windows or plugs, it is preferred to use a material having a refractive index approximately equal to that of the core. The window or plug on at least the end surface through which incident light enters is preferably provided with a film which is anti-reflecting in the wavelength range of light to be transmitted. If the incident light contains ultraviolet or infrared radiation, the incident end surface of the window or plug is preferably provided with a UV or IR cutoff film in order to prevent deterioration of the core by UV or prevent temperature rise by IR. It is acceptable to use a window or plug which itself is UV and/or IR absorbing.

In closing the cladding end with the plug, mechanical and other clamping means are applied if desired. Such clamping means include heat shrinkage treatment, bonding treatment, hose band clamping, wire wrapping, and fastening by shape memory alloy fasteners, sleeves, O-rings, and gaskets. Preferably, the plug is secured to the cladding by fitting a metal sleeve on the outer periphery of the cladding in which the plug is fitted and caulking the sleeve for compression deformation. The sleeve is of stainless steel, aluminum, copper, copper alloy (e.g., brass), steel, titanium and nickel, for example.

Figure 3:
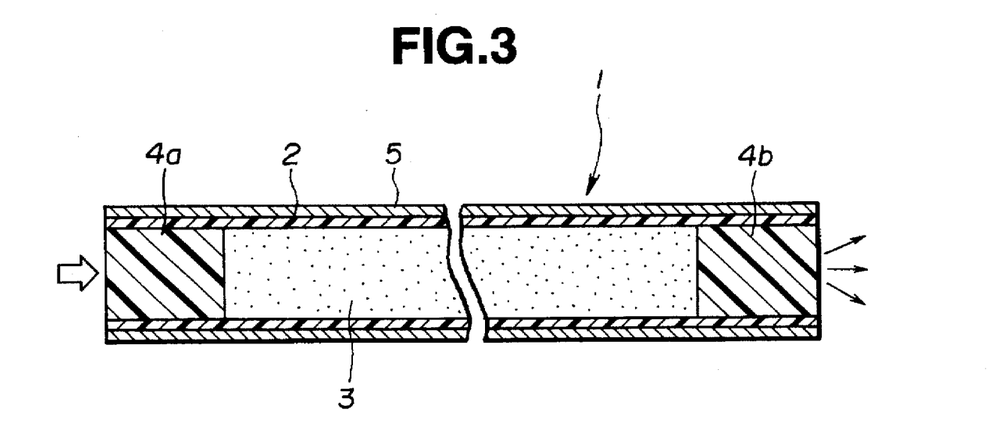

In a third embodiment of the invention, the cladding 2 is enclosed with a cover layer 5 as shown in FIG. 3 for the purpose of protecting the optical waveguide tube. The cover layer 5 may be made of plastic, metal, glass or inorganic materials. The cover layer can be formed in various ways. For example, polymers such as polyamides, epoxy resins, polyvinyl chloride, polycarbonate, polystyrene, fluororesins, polyethylene, polypropylene and polyurethane may be applied to the cladding by coating or extrusion molding. Also a tape of such polymer is wound on the cladding and subject to heat shrinkage treatment. Alternatively, a metal material such as stainless steel, aluminum, copper and iron or a polymer as mentioned above is formed into a pipe, bellows or spiral wire, into which the cladding fitted on the core is inserted. Further, by depositing a metal material to the cladding outer periphery by plating, evaporation or sputtering, the cladding can be coated with a metal film.

The cover material may be used alone or as a composite with another material.

Although the cover is provided mainly for protecting the optical waveguide tube, it may also be provided for the purpose of shielding light or allowing light to emerge through a selected area. For the last-mentioned purpose, the cover is provided with a plurality of apertures or made transparent in selected areas so that light may emerge outside through the areas, offering a tube having a plurality or series of light emitting spots.

The trapping agent may be contained and dispersed in the cover layer for removing coloring substances. The type of trapping agent is as mentioned previously. The amount of the trapping agent added can be increased because it does not adversely affect light transmission. The trapping agent may be added to the cover layer in an amount of 1 to 100%, preferably 1 to 50%, more preferably 1 to 30% by weight.

Figure 4:
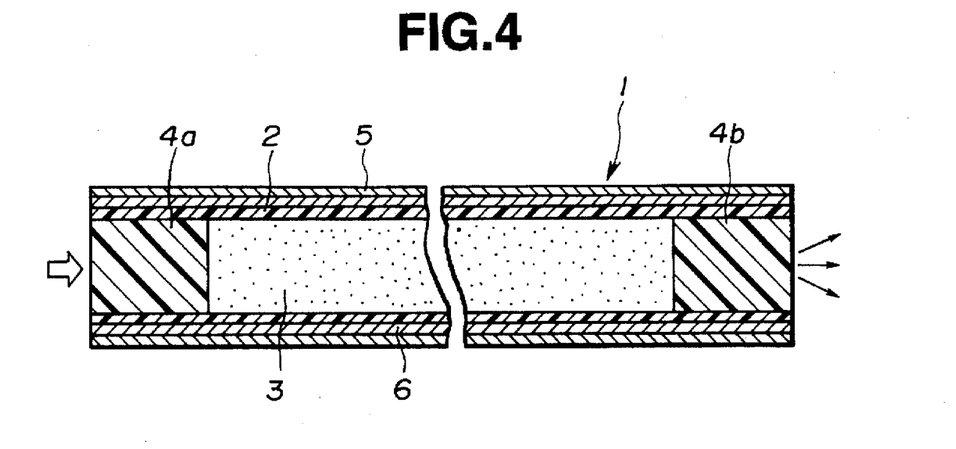

In a fourth embodiment of the invention, a coating layer 6 of the trapping agent is formed on the outer surface of the cladding 2 and further enclosed with a cover layer 5 as shown in FIG. 4.

Figure 5:
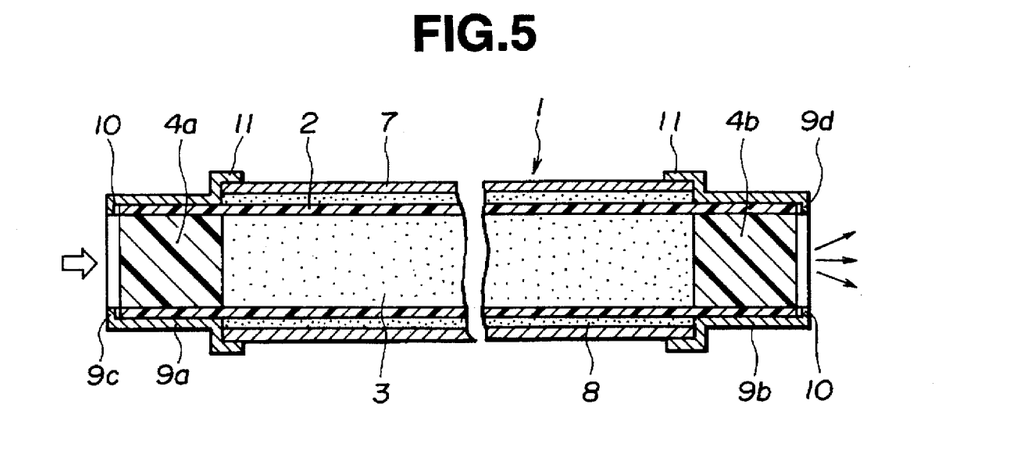

A fifth embodiment of the invention is shown in FIG. 5 wherein the cladding 2 is enclosed with a protective sheath 7 and a trapping agent 8 intervenes between the cladding 2 and the protective sheath 7. In a modification of this embodiment, a cover layer may be formed around the cladding 2 as shown in FIGS. 3 and 4 whereupon the protective sheath 7 encircles the cover layer.

In these embodiments, the cover layer 5 and protective sheath 7 are preferably formed of low gas permeable materials. More particularly, liquid cores, especially of silicone oil have the problem that silicone oil becomes white turbid upon absorption of moisture, losing optical transmission capability. This can be prevented by forming a water barrier layer outside the cladding as disclosed in JP-A 168607/1988. Simply covering the cladding with a water barrier layer is still insufficient. We have found that moisture entry can be effectively prevented by fitting caps on opposite ends of the cladding, disposing a low-gas permeable material around the cladding between the caps in a gas-tight manner, covering the end surfaces of the cladding with a sealant, and sealing gaps between the end surfaces of the cladding and the caps in a gas-tight manner.

The cladding material, especially silicone rubber allows moisture and other gases from the ambient air to penetrate therethrough relatively easily so that the liquid core, especially silicone oil absorbs moisture. To cover the cladding with a water barrier layer is effective. However, the mere covering of the cladding is still insufficient to prevent the liquid core, especially silicone oil from losing optical transmission capability when the tube is used in a hot humid atmosphere for a long time. Studying the cause of this loss, we have found that moisture and gases can penetrate into the cladding from its end surfaces to eventually detract from the optical transmission capability of the liquid core. Then by covering the end surfaces of the cladding with a sealant and sealing gaps between the cladding end surfaces and the caps in a gastight manner, entry of moisture is inhibited so that the liquid core is prevented from losing its optical transmission capability when the tube is used in a hot humid atmosphere for a long time.

This arrangement is illustrated in FIG. 5. A hollow tubular cladding 2 is filled with a liquid or fluid transparent core 3 and blocked at opposite open ends with plugs 4a, 4b. Caps 9a, 9b are fitted on the cladding at opposite ends to achieve secure engagement between the cladding 2 and the plugs 4a, 4b. An enclosure of low gas permeable material 7 surrounds the outer periphery of the cladding 2 and axially extends between the caps 9a and 9b to form a gas tight joint between the enclosure 7 and the caps 9a, 9b. The opposite end surfaces of the cladding 2 are coated with a sealant 10 and the gaps between the cladding end surfaces and the caps 9a, 9b are gas-tightly sealed. In the illustrated embodiment, the sealant 10 serves to seal both the cladding end surfaces and the gaps thereof with the caps.

The low gas permeable material encircling the cladding should preferably have such gas permeability that when a tubular member shaped therefrom of 1 m long is placed in a humid atmosphere at 60° C. and RH 90% for one week, the amount of moisture (water) penetrating into the member is less than 0.2 g, especially less than 0.05 g. Any of plastic, rubber, metal and inorganic materials may be used as long as it has such a limited moisture permeability. Preferred are rubber materials such as butyl rubber, halogenated butyl rubber, saturated butyl rubber, fluororubber, EPDM, and acrylic rubber and metal materials such as stainless steel, copper, brass, iron and aluminum. When the metal is applied to the outer periphery of the cladding, it is shaped into a spiral or wavy web to allow for flexibility. It is recommended that the cladding and the low gas permeable material layer are spaced slightly rather than in close contact, leaving a space therebetween for accommodating expansion and contraction of the optical tube (core and cladding) in response to temperature changes.

Figure 6:
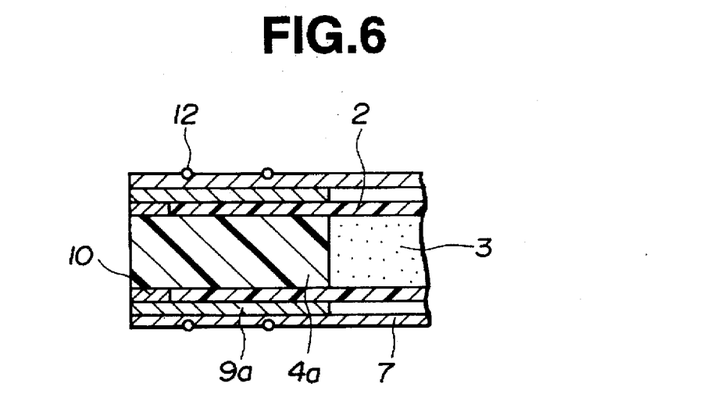

More particularly, the caps and the low gas permeable material layer encircling the cladding are closely joined because otherwise moisture will penetrate therethrough into the space between the low gas permeable material layer and the cladding. To this end, the caps 9a, 9b are joined to the low gas permeable material layer 7 at 11 as shown in FIG. 5 by adhesive bonding, welding, soldering or fusion welding using a barrier adhesive, sealant or the like. Alternatively, the low gas permeable material layer 7 is gas-tightly joined and secured to the cap 9a directly or by means of clamp means 12 as shown in FIG. 6. The clamp means 12 may be hose band fastening, wire wrapping, sleeve, O-ring, and gasket.

Figure 7:
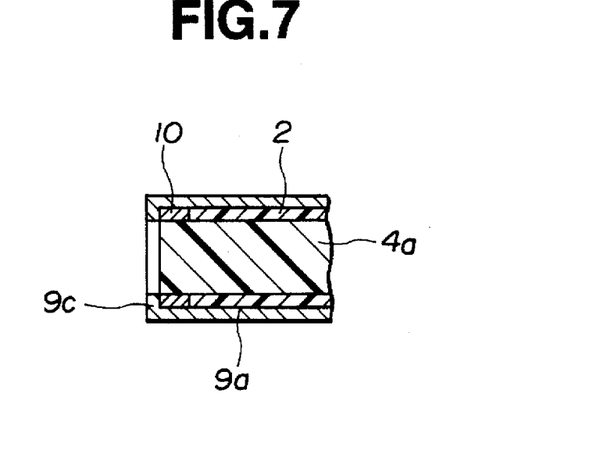
Figure 8:
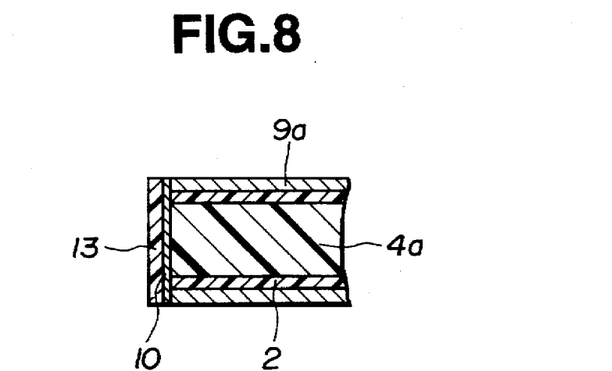
Figure 9:
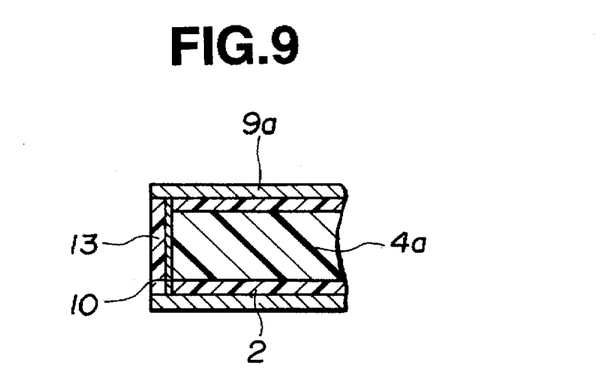

Also the sealant is used to coat the opposite end surfaces of the cladding 2 and block the gap between the opposite end surfaces of the cladding 2 and the caps 9a, 9b. The sealing means used herein include bonding or filling the gap with an adhesive or sealant, gas-tight engagement or fixation by an O-ring, and a combination thereof. For example, as shown in FIG. 5, the caps 9a, 9b are integrally provided at the opposite ends with annular flanges 9c, 9d. A barrier adhesive or sealant 10 capable of shutting off moisture is filled between the flanges 9c, 9d of the caps 9a, 9b and the opposite end surfaces of the cladding 2. Alternatively, in the embodiment shown in FIG. 6 wherein the plug 4a and cap 9a extend beyond the end of the cladding 2 to define an annular recess, a barrier adhesive or sealant 10 is filled in the recess. In this embodiment, the barrier adhesive or sealant should preferably be transparent and have a lower refractive index than the plug. Still further embodiments are shown in FIGS. 8 and 9. A moisture barrier transparent disc 13 of glass or resin is joined to the tube end with a transparent barrier adhesive or sealant 10 so as to cover the end surfaces of the plug 4a, cladding 2 and cap 9a in FIG. 8 or the end surfaces of the plug 4a and cladding 2 in FIG. 9. It is to be noted that in the embodiments shown in FIGS. 5 and 7, the optical waveguide tube can be provided with a flat end surface by joining a transparent disc or filling a transparent material to the end surface of the plug 4a. In the embodiments shown in FIGS. 6 and 7, an O-ring may be fitted instead of the barrier adhesive or sealant 10. The overlying cap 9a is caulked to compress the O-ring for a firm joint between the cap and the plug, establishing blockage between the cap and cladding. In this case, an adhesive or sealant may be filled between the O-ring and the cladding.

The adhesives or sealants used herein include epoxy, cyanoacrylate, polyurethane, acrylic, EVA, polysulfide, Thiokol, silicone, polyester, polyimide, fluororubber, SBS, TPE (e.g., SIS), polyamide, and ceramic (e.g., alumina and silica base) adhesives. Where the sealing layer is thin, these materials exert their function even when their gas barrier properties are high. However, use of low gas permeable materials is preferred.

The O-rings used herein are of rubber materials such as acrylic rubber, fluororubber, EPDM and butyl rubber and plastic materials such as polyethylene, fluororesin, and flexible nylon.

EXAMPLE

Examples of the present invention are given below by way of illustration and not by way of limitation. All parts are by weight.

Experiment 1

A VDF-HFP bipolymer terminated with iodine atoms (Daiel G801) and a VDF-HFP bipolymer terminated with bromine atoms (Byton VTR7085) were used as fluororubbers. Each fluororubber, 100 parts, was blended with 0.75 part of 2,5-dimethyl-2,5-di(t-butylperoxy)hexane and 2 parts of triallyl isocyanurate and milled to form a fluororubber compound.

Each rubber compound was formed into a sheet of 1 mm gage and press vulcanized at 160° C. for 30 minutes.

The vulcanized rubber sheets were measured for transmittance at a wavelength of 400 nm.

For comparison purposes, two VDF-HFP bipolymers (Daiel G201 and Daiel G704) were used as fluororubbers and vulcanized with polyamine and polyol, respectively.

The results are shown in Table 1.

TABLE 1

| Sample No. | Fluororubber Type | Terminal | Vulcanization | Transmittance (%) @400 nm |
|---|---|---|---|---|
| 11 | Daiel G801 | I | peroxide | 76 |
| 12 | Byton VTR7085 | Br | peroxide | 26 |
| 13 | Daiel G201 | — | polyamine | 16 |
| 14 | Daiel G704 | — | polyol | 21 |

Experiment 2

A VDF-HFP bipolymer terminated with iodine atoms (Daiel G901) and a VDF-HFP bipolymer terminated with bromine atoms (Byton VTR7085) were used as fluororubbers. Each fluororubber, 100 parts, was blended with 1.5 parts of 2,5-dimethyl-2,5-di(t-butylperoxy)hexane and 4 parts of triallyl isocyanurate and milled to form a fluororubber compound.

Each rubber compound was formed into a sheet of 1 mm gage, subjected to press vulcanization at 160° C. for 30 minutes as primary vulcanization and then to peroxide vulcanization in an oven at 180° C. for 5 hours as secondary vulcanization.

Each vulcanized rubber was treated as follows.

Ethanol washing

The vulcanized rubber was immersed in ethanol at 20° C. for 100 hours.

Heat vacuum treatment

The vulcanized rubber was placed in a vacuum oven where it was treated at 140° C. and 10 Torr for 10 hours.

Each vulcanized rubber before and after the treatment was measured for free halogen atom content and transmittance at a wavelength of 400 nm and 500 nm. The measurement of free halogen atom content is as previously described in this disclosure.

The results are shown in Table 2.

TABLE 2

| Sample No. | Fluororubber Type | Terminal | Residual halogen before treatment | Treatment | Residual halogen after treatment | Transmittance (%) [before treatment] 400 nm | Transmittance (%) [before treatment] 500 nm | Transmittance (%) [after treatment] 400 nm | Transmittance (%) [after treatment] 500 nm |
|---|---|---|---|---|---|---|---|---|---|
| 21 | Daiel G901 | I | 200 ppm | ethanol wash | 16 ppm | 62 | 33 | 83 | 90 |
| 22 | Byton VTR7085 | Br | 180 ppm | ethanol wash | 11 ppm | 23 | 29 | 81 | 88 |
| 23 | Daiel G901 | I | 200 ppm | heat vacuum | 5 ppm | 61 | 39 | 88 | 92 |
| 24 | Byton VTR7085 | Br | 180 ppm | heat vacuum | 3 ppm | 24 | 26 | 85 | 91 |

Experiment 3

A VDF-HFP bipolymer terminated with iodine atoms (Daiel G901) and a VDF-HFP bipolymer terminated with bromine atoms (Byton VTR7085) were used as fluororubbers. Each fluororubber, 100 parts, was blended with 1.5 parts of 2,5-dimethyl-2,5-di(t-butylperoxy)hexane, 4 parts of triallyl isocyanurate, and a trapping agent shown in Table 3 and milled to form a fluororubber compound.

Each rubber compound was formed into a sheet of 1 mm gage, subjected to press vulcanization at 160° C. for 30 minutes as primary vulcanization and then to peroxide vulcanization in an oven at 180° C. for 5 hours as secondary vulcanization.

The vulcanized rubber sheets were measured for transmittance at a wavelength of 500 nm for I-terminated fluororubber and 400 nm for Br-terminated fluororubber.

The results are shown in Table 3.

TABLE 3

| Sample No. | Fluoro-rubber terminal | Trapping agent Type | Amount | Transmittance (%) |
|---|---|---|---|---|
| 31 | I | — | — | 76 (500 nm) |
| 32 | Br | — | — | 26 (400 nm) |
| 33 | I | silica gel* | 0.5 parts | 80 (500 nm) |
| 34 | Br | silica gel* | 0.5 parts | 40 (400 nm) |
| 35 | I | silica** | 0.5 parts | 79 (500 nm) |
| 36 | Br | silica** | 0.5 parts | 36 (400 nm) |
| 37 | I | MgO | 0.5 parts | 81 (500 nm) |
| 38 | Br | MgO | 0.5 parts | 45 (400 nm) |

*silica gel for chromatographic use, 100–200 mesh
**CAB-O-SIL H-5

Experiment 4

A VDF-HFP bipolymer terminated with iodine atoms was used as a fluororubber. Each fluororubber, 100 parts, was blended with 2,5-dimethyl-2,5-di(t-butylperoxy)hexane in the amount shown in Table 4, and 4 parts of triallyl isocyanurate, and milled to form a fluororubber compound.

Each rubber compound was formed into a sheet of 1 mm gage, subjected to press vulcanization at 160° C. for 30 minutes as primary vulcanization and then to peroxide vulcanization in an oven at 180° C. for 5 hours as secondary vulcanization.

The vulcanized rubber sheets were measured for transmittance at a wavelength of 500 nm.

The results are shown in Table 4.

TABLE 4

| Sample No. | Amount of peroxide | Transmittance (%) |
|---|---|---|
| 41 | 0 parts | 40 |
| 42 | 1 parts | 72 |
| 43 | 2 parts | 79 |
| 44 | 3 parts | 81 |
| 44 | 4 parts | 81 |

Example 1

A VDF-HFP bipolymer terminated with iodine atoms was used as a fluororubber. The fluororubber, 100 parts, was blended with 0.75 part of 2,5-dimethyl-2,5-di(t-butylperoxy)hexane, 2 parts of triallyl isocyanurate, and 0.5 part of a silane coupling agent (γ-methacryloxypropyltrimethoxysilane) and milled to form a fluororubber compound.

The fluororubber compound was dissolved in methyl ethyl ketone to form a 25 wt % solution of the fluororubber. A dimethylsilicone rubber tube of 10 mm in inner diameter, 12 mm in outer diameter and 1 m long was coated on the inner surface with the solution.

The coating was dried to remove the solvent, subjected to primary vulcanization in an oven at 160° C. for 30 minutes and then to secondary vulcanization in a nitrogen atmosphere at 180° C. for 5 hours. After the heat vacuum treatment, there was obtained a tube or cladding having on the inner surface a layer of vulcanized fluororubber having a thickness of 0.1 mm and a residual halogen atom content of 4 ppm.

The cladding was filled with methylphenylsilicone oil having a phenyl content of 27% and closed at opposite ends with plugs of Pyrex® glass.

The resulting optical waveguide tube was allowed to stand at 120° C. for 20 days. The cladding underwent no swelling and maintained satisfactory light transmission capability.

Comparative Example 1

An optical waveguide tube was prepared as in Example 1 except that the silicone rubber tube was lined with an addition reaction type silicone rubber having a refractive index of 1.405 and a viscosity of 600 centipoise instead of the fluororubber.

The tubes of Example 1 and Comparative Example 1 were measured for swelling factor and light transmittance. The results are given below.

Swelling factor

The tube of Example 1 experienced a little size change.

The tube of Comparative Example 1 expanded about 11% in length and air penetrated into the tube over an axial distance of about 20 cm.

Light transmittance

A light transmission spectrum was measured over a wavelength range of 400 to 700 nm using a spectrometer UV7000 manufactured by Hitachi K.K. From the data, an average light transmittance over the range of 400 to 700 nm was calculated.

| | Initial | After 120° C./20 days |
|---|---|---|
| Example 1 | 80% | 78% |
| Comparative Example 1 | 78% | 11% |

Example 2

A VDF-HFP bipolymer terminated with iodine atoms was used as a fluororubber. The fluororubber, 100 parts, was blended with 0.3 parts of 2,5-dimethyl-2,5-di(t-butylperoxy)hexane, and 2 parts of triallyl isocyanurate, and milled to form a fluororubber compound.

The fluororubber compound was molded into a tube or cladding having an inner diameter of 10 mm, an outer diameter of 11 mm, and a length of 1,000 mm and vulcanized in a nitrogen-purged oven at 160° C. for 30 minutes and then at 180° C. for 5 hours. After the heat vacuum treating, the vulcanized fluororubber had a residual halogen atom content of 2 ppm.

The cladding was filled with silicone oil and closed at opposite ends with plugs of Pyrex® glass to form an optical waveguide tube.

Example 3

A fluororubber compound having the same composition as in Example 2 except that no peroxide was blended was molded as in Example 2 and vulcanized with electron rays under the conditions: an applied voltage of 750 kV and a dose of 20 Mrad. The vulcanized fluororubber had a residual halogen atom content of 2 ppm. An optical waveguide tube was fabricated as in Example 2.

The optical waveguide tubes of Examples 2 and 3 performed well over a long period of time. That is, the core was not substantially colored and optical transmission capability was maintained satisfactory.

Example 4

The fluororubber compound of Sample No. 21 of Experiment 2 was molded into a tube or cladding having an inner diameter of 10 mm, an outer diameter of 12 mm, and a length of 2 m and vulcanized. The cladding was filled with silicone oil and closed at opposite ends with plugs of Pyrex® glass (diameter 10 mm, length 20 mm) to form an optical waveguide tube.

Example 5

The fluororubber compound of Sample No. 24 of Experiment 2 was molded into a tube or cladding having an inner diameter of 10 mm, an outer diameter of 12 mm, and a length of 2 m and vulcanized. The cladding was filled with silicone oil and closed at opposite ends with plugs of Pyrex® glass (diameter 10 mm, length 20 mm) to form an optical waveguide tube.

The optical waveguide tubes of Examples 4 and 5 performed well over a long period of time. That is, the core was not substantially colored and optical transmission capability was maintained satisfactory.

Example 6

The fluororubber compound of Sample No. 33 of Experiment 3 was molded into a tube or cladding having an inner diameter of 10 mm, an outer diameter of 12 mm, and a length of 1 m and vulcanized. After the heat vacuum treatment, the vulcanized fluororubber had a residual halogen atom content of 1.5 ppm. The cladding was filled with silicone oil and closed at opposite ends with plugs of Pyrex® glass (diameter 10 mm, length 20 mm) to form an optical waveguide tube.

Example 7

The fluororubber compound of Sample No. 37 of Experiment 3 was molded into a tube or cladding having an inner diameter of 10 mm, an outer diameter of 12 mm, and a length of 1 m and vulcanized. After the heat vacuum treatment, the vulcanized fluororubber had a residual halogen atom content of 1.0 ppm. The cladding was filled with silicone oil and closed at opposite ends with plugs of Pyrex® glass (diameter 10 mm, length 20 mm) to form an optical waveguide tube.

Example 8

A tube of dimethylsilicone containing 30 phr of silica gel having an inner diameter of 10 mm and an outer diameter of 12 mm was lined with the fluororubber compound of Sample No. 37 of Experiment 3 to a thickness of 50 μm. An optical waveguide tube was similarly fabricated. After the heat vacuum treatment, the vulcanized fluororubber had a residual halogen atom content of 1.5 ppm.

Example 9

The optical tube of Example 6 was enclosed with a spiral pipe of stainless steel having an inner diameter of 14 mm and an outer diameter of 16 mm. In the space between the cladding and the spiral pipe, 10 g of alumina having a mean particle size of 1 μm was distributed.

Example 10

The optical tube of Example 6 was enclosed with a spiral pipe of stainless steel having an inner diameter of 14 mm and an outer diameter of 16 mm. In the space between the cladding and the spiral pipe, 4 g of molecular sieves 4A was distributed.

The optical waveguide tubes of Examples 6 to 10 maintained satisfactory optical transmission capability over a long period of time while the core was not substantially colored.

Reference Examples

A dimethylsilicone tube having an inner diameter of 6 mm, an outer diameter of 8 mm and a length of 2 m was lined on the inner surface with a fluororubber layer having a refractive index of 1.38 and a thickness of 100 μm by a coating technique. This cladding was filled with a methylphenylsilicone oil having a refractive index of 1.50 and closed at opposite ends with plugs of Pyrex® glass having an outer diameter of 6 mm and a length of 20 mm. Stainless steel sleeves were fitted on the cladding at the opposite ends and caulked.

The dimethylsilicone cladding on the outer periphery was enclosed with a tube of polyvinylidene chloride having a thickness of 500 μm (Reference Example 1); and additionally, the opposite end surfaces of the dimethylsilicone cladding were coated with the polyvinylidene chloride (Reference Example 2). The dimethylsilicone cladding on the outer periphery was enclosed with a flexible pipe of stainless steel (Reference Example 3); and additionally, the opposite end surfaces of the dimethylsilicone cladding are closed with stainless steel caps using silicone adhesive (Reference Example 4). The dimethylsilicone cladding was used without enclosure (Reference Example 5).

These optical waveguide tubes were placed in a hot humid oven at 60° C. and RH 95% for a certain time (as indicated below) and then allowed to stand at room temperature for one hour. The state of the core (methylphenylsilicone oil) was observed.

The dimethylsilicone cladding on the outer periphery was covered with butyl rubber having a thickness of 4 mm. Stainless steel sleeves were fitted on the cladding at the opposite ends and caulked in a gas-tight manner. Glass discs of 1 mm thick were joined to the opposite ends of the tube using an acrylic adhesive as shown in FIG. 9 (Reference Example 6).

The results are shown below.

Reference Example 1

When the tube was allowed to stand at room temperature after treatment in the hot humid oven for 10 days, the core became white turbid and opaque to light.

Reference Example 2

The tube remained unchanged even after treatment in the hot humid oven for 30 days.

Reference Example 3

When the tube was allowed to stand at room temperature after treatment in the hot humid oven for 14 days, the core became white turbid and opaque to light.

Reference Example 4

The tube remained unchanged even after treatment in the hot humid oven for 30 days.

Reference Example 5

When the tube was allowed to stand at room temperature after treatment in the hot humid oven for 5 days, the core became white turbid and opaque to light.

Reference Example 6

The tube remained unchanged even after treatment in the hot humid oven for 30 days.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical waveguide tube comprising a transparent core and a cladding having a lower refractive index than the core, characterized in that
    at least the inner surface of said cladding in contact with said core is formed of a fluororubber which has been vulcanized by radical reaction crosslinking and has a residual halide content of up to 80 ppm calculated as halogen atom;
    wherein after vulcanization, the fluororubber is subjected to solvent washing, heat treatment, vacuum treatment, or a combination thereof so that its residual halide content is up to 80 ppm calculated as halogen atom.

2. The optical wave guide tube of claim 1 wherein the residual halide content of up to 30 ppm calculated as halogen atom.

3. The optical waveguide of claim 1 wherein the fluororubber contains iodine atoms and has been crosslinked with a peroxide.

4. The optical waveguide of claim 1 wherein said cladding consists of the fluororubber.

5. The optical waveguide of claim 1 wherein said core is a liquid core.

6. The optical waveguide tube of claim 5 wherein said liquid core is a silicone fluid.

7. An optical waveguide tube comprising a transparent core and a cladding having a lower refractive index than the core, characterized in that
    at least the inner surface of said cladding in contact with said core is formed of a fluororubber which has been vulcanized by radical reaction crosslinking and has a residual halide content of up to 80 ppm calculated as halogen atom, which further includes a protective sheath surrounding said cladding with a coloring substance trapping agent being interposed between the protective sheath and said cladding.

8. The optical waveguide tube of claim 7 wherein said protective sheath is formed of a low gas permeable material.

9. The optical waveguide of claim 7 wherein the fluororubber contains iodine atoms and has been crosslinked with a peroxide.

10. The optical waveguide of claim 7 wherein said cladding consists of the fluororubber.

11. The optical waveguide of claim 7 wherein said core is a liquid core.

12. An optical waveguide tube comprising a transparent core and a cladding having a lower refractive index than the core, characterized in that
    at least the inner surface of said cladding in contact with said core is formed of a fluororubber which has been vulcanized by radical reaction crosslinking and has a residual halide content of up to 80 ppm calculated as halogen atom, wherein said cladding comprises a coloring substance trapping agent.

13. The optical waveguide of claim 12 wherein the fluororubber contains iodine atoms and has been crosslinked with a peroxide.

14. The optical waveguide of claim 12 wherein said cladding consists of the fluororubber.

15. The optical waveguide of claim 12 wherein said core is a liquid core.

16. An optical waveguide tube comprising a transparent core and a cladding having a lower refractive index than the core, characterized in that
    at least the inner surface of said cladding in contact with said core is formed of a fluororubber which has been vulcanized by radical reaction crosslinking and has a residual halide content of up to 80 ppm calculated as halogen atom, which further includes a cover layer surrounding said cladding and containing a coloring substance trapping agent.

17. The optical waveguide tube of claim 16 which further includes a protective sheath surrounding said cover layer with a coloring substance trapping agent being interposed between the protective sheath and said cover layer.

18. The optical waveguide of claim 16 wherein the fluororubber contains iodine atoms and has been crosslinked with a peroxide.

19. The optical waveguide of claim 16 wherein said cladding consists of the fluororubber.

20. The optical waveguide of claim 16 wherein said core is a liquid core.

21. An optical waveguide tube comprising a transparent core and a cladding having a lower refractive index than the core, characterized in that
    at least the inner surface of said cladding in contact with said core is formed of a fluororubber which has been vulcanized by radical reaction crosslinking and has a residual halide content of up to 80 ppm calculated as halogen atom, which further includes a coating layer of a coloring substance trapping agent surrounding said cladding and a cover layer surrounding the coating layer.

22. The optical waveguide of claim 21 wherein the fluororubber contains iodine atoms and has been crosslinked with a peroxide.

23. The optical waveguide of claim 21 wherein said cladding consists of the fluororubber.

24. The optical waveguide of claim 21 wherein said core is a liquid core.

25. The optical waveguide tube of claim 7, 12, 16, 17 or 21 wherein said trapping agent is a zeolite adsorbent.

26. An optical waveguide tube comprising a transparent core and a cladding having a lower refractive index than the core, characterized in that at least the inner surface of said cladding in contact with said core is formed of a fluororubber which has been vulcanized by radical reaction crosslinking and has a residual halide content of up to 80 ppm calculated as halogen atom, wherein said cladding includes a rubber elastomer defining an inner surface and a layer of the vulcanized fluororubber inside the inner surface of the rubber elastomer.

27. The optical waveguide tube of claim 26 wherein the layer of the vulcanized fluororubber is formed by coating a layer of fluororubber onto the inner surface of the rubber elastomer and crosslinking the fluororubber through radical reaction.

28. The optical waveguide tube of claim 26 or 27 wherein said rubber elastomer is a vulcanized silicone rubber, butyl rubber of EPDM rubber.

29. The optical waveguide tube of claim 26 or 27 wherein said rubber elastomer is a thermoplastic elastomer.

30. The optical waveguide of claim 26 wherein the fluororubber contains iodine atoms and has been crosslinked with a peroxide.

31. The optical waveguide of claim 26 wherein said cladding consists of the fluororubber.

32. The optical waveguide of claim 26 wherein said core is a liquid core.

* * * * *